United States Patent [19]

Nakagawa et al.

[11] 4,064,850

[45] Dec. 27, 1977

[54] INTERNAL COMBUSTION ENGINE WITH MAIN AND AUXILIARY COMBUSTION CHAMBERS

[75] Inventors: Yasuhiko Nakagawa, Fujisawa; Masahiro Sasaki; Teruyuki Ito, both of Yokohama; Tosimitu Matuoka, Yokosuka, all of Japan

[73] Assignee: Nissan Motor Co., Ltd., Yokohama, Japan

[21] Appl. No.: 649,596

[22] Filed: Jan. 16, 1976

[30] Foreign Application Priority Data

Jan. 17, 1975 Japan .................................. 50-7002

[51] Int. Cl.² .............................................. F02B 19/10
[52] U.S. Cl. .............................. 123/75 B; 123/52 M; 123/127; 123/191 S; 261/23 A
[58] Field of Search ............ 123/32 SP, 32 ST, 52 M, 123/75 B, 122 AC, 127, 141, 191 S, 191 SP; 261/23 A, DIG. 21, DIG. 55

[56] References Cited

U.S. PATENT DOCUMENTS

| | | | |
|---|---|---|---|
| 1,802,024 | 4/1931 | Kreis | 123/52 M |
| 2,179,143 | 11/1939 | Brown | 123/75 B |
| 3,211,137 | 10/1965 | Love | 123/75 B |
| 3,505,983 | 4/1970 | Hartel | 123/52 M |
| 3,659,564 | 5/1972 | Suzuki et al. | 123/127 |
| 3,892,214 | 7/1975 | Heidacker | 123/122 AC |
| 3,921,607 | 11/1975 | Kawamoto | 123/32 SP |

Primary Examiner—Ronald H. Lazarus
Assistant Examiner—David D. Reynolds

[57] ABSTRACT

An automotive internal combustion engine having main and auxiliary combustion chambers for each of the cylinders and combined with a carburetor is provided with an air-fuel mixture induction system which comprises an intake manifold providing communication between the carburetor and each of the main combustion chambers, characterized by passageways leading to the auxiliary combustion chambers and open into the intake manifold or the intake ports for the main combustion chambers through an opening in the main tube portion of the intake manifold, openings respectively formed in the runner portions of the intake manifold or openings formed in wall portions defining the intake ports for the main combustion chambers.

19 Claims, 12 Drawing Figures

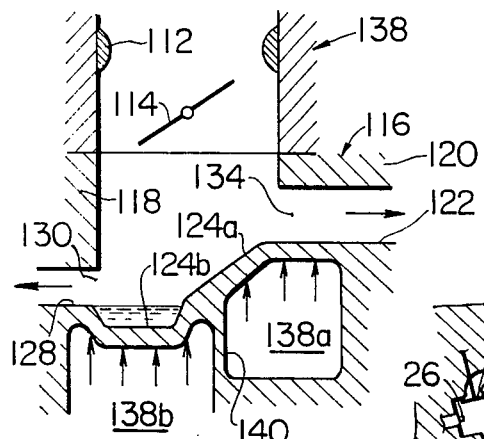
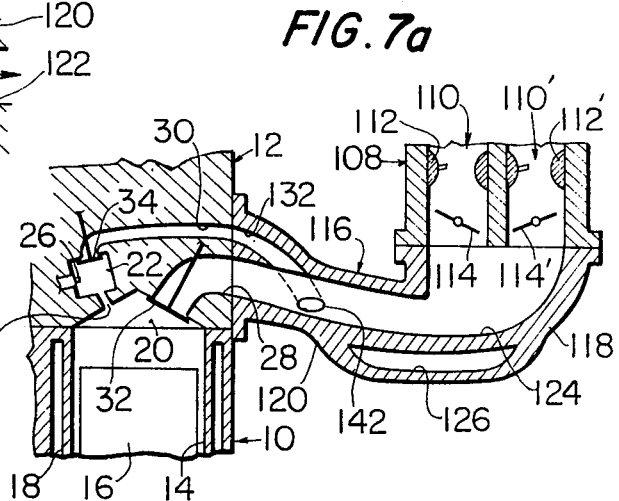
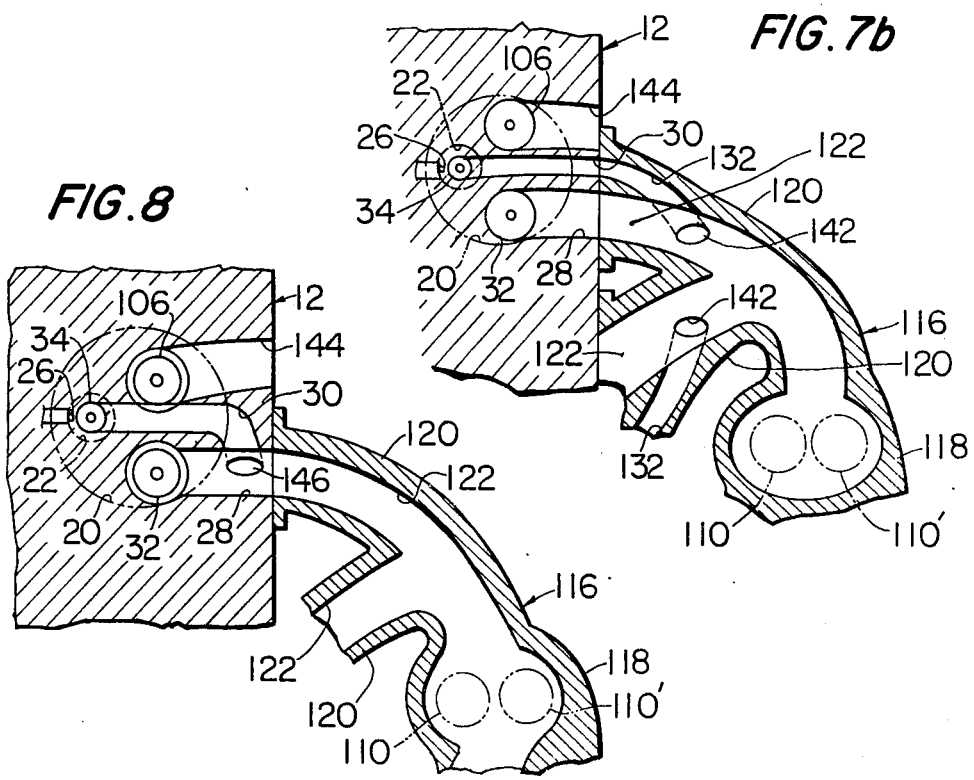

INTERNAL COMBUSTION ENGINE WITH MAIN AND AUXILIARY COMBUSTION CHAMBERS

The present invention relates generally to internal combustion engines for automotive vehicles and, particularly, to a multiple-cylinder, reciprocating-piston, spark-ignition, automotive internal combustion engine using a carburetor as the air-fuel delivery system. More particularly, the present invention is concerned with an air-fuel mixture induction system for use with an internal combustion engine of the described type and having main and auxiliary combustion chambers for each of the engine cylinders.

The automotive internal combustion engine having main and auxiliary combustion chambers provided for each of the engine cylinders is one of the automotive engines which have been developed and put into use for the purpose of providing solutions to the vehicular pollution problems of date. The engine is designed to operate, in general, on a relatively lean air-fuel mixture combusted in each of the cylinders with a view to minimizing the concentrations of toxic combustible compounds such as hydrocarbons and carbon monoxide in the exhaust gases emitted from each engine cylinder. The air-fuel mixture supply system or the carburetor for use with the internal combustion engine of this type is usually constructed essentially similarly to an ordinary two-barrel or dual carburetor consisting of two, main and auxiliary, barrels each having its own venturi, throttle valve and fuel nozzles. The main barrel is arranged to deliver a relatively lean air-fuel mixture having an air-to-fuel ratio within the range of, for example, from about 15:1 to about 30:1 whilst the auxiliary barrel is arranged to deliver a relatively rich mixture having an air-to-fuel ratio within the range of, for example, from about 1:1 to about 5:1. The mixtures of air and fuel thus delivered respectively from the main and auxiliary carburetor barrels are introduced independently of each other into the main and auxiliary combustion chambers of the individual engine cylinders by way of main and auxiliary intake manifolds, respectively. The auxiliary combustion chamber is formed in the cylinder head over each of the cylinders and is in constant communication with the main combustion chamber above the piston in the cylinder through a calibrated flame passageway which is also formed in the cylinder head. An ignition spark plug projects into the auxiliary combustion chamber in each of the cylinders so that the relatively rich air-fuel mixture drawn into the auxiliary combustion chambers is fired toward the end of the intake stroke of each four-stroke cycle of the cylinder. The flames thus produced in the auxiliary combustion chamber as a result of the combustion of the relatively rich air-fuel mixture in the auxiliary combustion chamber spurts into the associated main combustion chamber through the above-mentioned flame passageway whereupon the relatively lean mixture which has been drawn into the main combustion chamber is fired with the agency of the flames propagating from the flame passageway into the main combustion chamber during combustion stroke of the cylinder. Though arranged to provide different ranges of air-to-fuel ratios, the main and auxiliary barrels of the carburetor are operatively connected together and are controlled on the basis of the substantially the same principles so that the mixtures delivered from the two barrels are proportioned to air-to-fuel ratios within the prescribed ranges depending on the various operating conditions of the engine, especially on the varying load requirement on the engine. It is, however, extremely difficult and practically almost unfeasible to have the carburetor conditioned and operated in such a manner that the air-to-fuel ratios provided by the main and auxiliary barrels are accurately varied to be optimum for every operating condition of the engine such as the closed-throttle, part-throttle and full-throttle conditions. The total performance of the carburetor is, thus, short of fully repaying the added complications and the resultant extra production cost of the two-barrel carburetor. A carburetor has therefore been proposed which is provided with a suction conduit providing communication between each of the auxiliary combustion chambers and the carburetor feeding the main combustion chambers. The suction conduit is connected to a mixture inlet pipe which projects into the carburetor upstream of the throttle valve and downstream of the venturi so that the mixture of air and fuel produced upstream of the throttle valve is drawn in a limited proportion into the suction conduit while the major portion of the mixture in the carburetor is passed over to the main combustion chambers. An additional fuel feed conduit leads from the main fuel delivery circuit (leading from the float bowl to the main fuel discharge nozzle, as is well known) of the carburetor and opens into the suction conduit downstream of the mixture inlet pipe so that the fuel entering the suction conduit from the main fuel delivery circuit is admixed to and enrich the air-fuel mixture drawn from the carburetor. The suction conduit terminates in each of the auxiliary combustion chambers so that the relatively rich air-fuel mixture thus produced in the suction conduit is supplied to each auxiliary combustion chamber. A typical example of the carburetor arranged in this fashion is shown in U.S. Pat. No. 3,659,564 to Toshio Suzuki et al. The mixture delivery system of this nature is not capable of supplying the auxiliary combustion chamber with an air-fuel mixture proportioned in strict relation to the air-to-fuel ratio of the mixture supplied to the main combustion chamber but is, nevertheless, advantageous in that the performance achieved of the engine is substantially comparable to that achieved by the engine arranged with the main and auxiliary barrels even through the former is far simpler in construction than the latter. When compared with an ordinary carburetor for use with an engine with only one combustion chamber for each cylinder, however, the mixture delivery system still has drawbacks in that the installations of the suction conduit and associated fittings presents another cause of added complications of construction and extra cost of production of the mixture delivery system and that arrangement must be made so as to keep the suction conduit sufficiently warm and enable the mixture to smoothly flow through the conduit under various operational and environmental conditions of the engine. Furthermore, the mixture inlet pipe projecting into the carburetor upstream of the throttle valve will constitute a resistance to the flow of the air-fuel mixture through the carburetor and will consequently impair the mixture induction efficiency. The present invention contemplates elimination of these drawbacks.

It is, therefore, a prime object of the present invention to provide an improved air-fuel mixture induction system for a multiple-cylinder automotive internal combustion engine having main and auxiliary combustion chambers for each of the engine cylinders and a carburetor which is constructed substantially similarly to a carburetor for use with an ordinary automotive internal combustion engine having only one combustion chamber for each engine cylinder. The mixture induction system according to the present invention thus features, inter alia, extremely simplified construction, performance quality nevertheless comparable to that achievable by any prior art counterpart, smoothness of flow of the mixture, reduced production cost, alleviated space requirement, and adaptability to any existing carburetor designed for use with an ordinary multiple-cylinder automotive internal combustion engine.

In accordance with the present invention, the above-mentioned prime object is accomplished basically in an air-fuel mixture induction system for an automotive multiple-cylinder internal combustion engine having main and auxiliary combustion chambers for each of the engine cylinders and combined with a carburetor having a throttle valve, comprising main mixture delivery passageway means having internal wall portions formed with intake ports respectively in communication with the main combustion chambers of the engine cylinders, and an intake manifold consisting of a main tube portion having an internal space or plenum area in communication with the carburetor downstream of the throttle valve and runner portions branched from the main tube portion and communicating upstream with the internal space or plenum area in the main tube portion and downstream with the intake port, and auxiliary passageways each providing communication between each of the auxiliary combustion chambers of the individual engine cylinders and the internal space or plenum area in the main tube portion through an opening in at least one of said internal wall portions.

The above-mentioned opening may be formed in the main tube portion of the intake manifold, in which instance the induction system further comprises a passageway leading from the opening and branched into the auxiliary passageways leading to the intake ports for the main combustion chambers. As an alternative, the auxiliary passageways may be open respectively into the runner portions of the intake manifold each through an opening formed in the internal wall portion defining the passageway in each runner portion or open respectively into the intake ports each through an opening formed in the internal wall portion defining each intake port.

The features and advantages of the air-fuel mixture induction system according to the present invention will become more apparent from the following description taken in conjunction with the accompanying drawings in which like reference numerals designate corresponding members and units throughout the various figures and in which:

FIG. 3b is a cross sectional view of the arrangement illustrated in FIG. 3a.

FIGS. 6a, 6b and 6c are schematic vertical sectional views each showing part of an arrangement including a modification of the embodiment illustrated in FIG. 5;

FIG. 7a is a view similar to FIG. 3a but shows an arrangement including still another preferred embodiment of the mixture induction system according to the present invention;

FIG. 7b is a cross sectional view of the arrangement illustrated in FIG. 7a; and FIG. 8 is a schematic cross sectional view of still another preferred embodiment of the mixture induction system according to the present invention.

Figure 1:
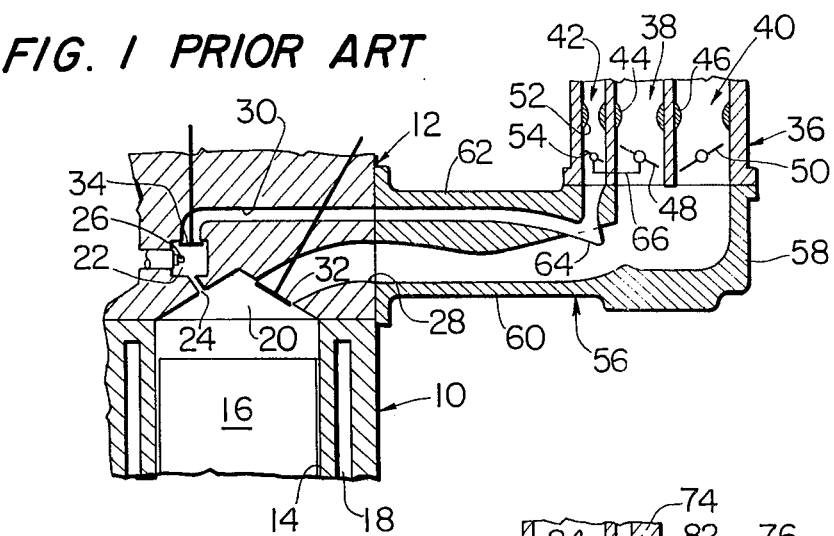
FIG. 1 is a schematic vertical sectional view showing an example of part of a prior art mixture delivery and induction arrangement for use with an internal combustion engine of the described nature.

Referring to FIG. 1 of the drawings, a multiple-cylinder internal combustion engine comprises a cylinder block 10 and a cylinder head 12 located stop the cylinder block 10. The cylinder block 10 is formed with a series of cylinder 14 (only one of which is shown for simplicity of illustration) and a reciprocating piston 16 is movable up and down in each cylinder 14, as is well known. The cylinder block 10 is shown further formed with pockets or water jackets 18 each surrounding each cylinder 14. Cooling water is circulated through the water jackets 18 by a water pump (not shown) and absorbs heat from the cylinder block 10. On the other hand, the cylinder head 12 is formed with a main combustion chamber 20 at the top of each cylinder 14 and an auxiliary combustion chamber 22 which is in constant communication with the main combustion chamber 20 through a calibrated flame passageway 24 also formed in the cylinder head 12. An ignition spark plug 26 projects into the auxiliary combustion chamber 22. The cylinder head 12 is further formed with main and auxiliary intake ports 28 and 30 leading across main and auxiliary intake valves 32 and 34 to the main and auxiliary combustion chambers 20 and 22, respectively, of each engine cylinder 14. A carburetor 36, only part of which is shown, has main, primary and secondary, barrels 38 and 40 and an auxiliary barrel 42. The main barrels 38 and 40 have respective venturis 44 and 46 and respective throttle valves 48 and 50 located downstream of the venturis 44 and 46, respectively. As is well known, the primary barrel 38 is responsible for delivery of air-fuel mixture under most operating conditions of the engine, while the secondary barrel 40 is adapted to be brought into operation for full engine power. Similarly to the main barrels 38 and 40, the auxiliary barrel 42 of the carburetor 36 comprises a venturi 52 and a throttle valve 54 located downstream of the venturi 52. The carburetor 36 constructed and arranged in this manner is connected to the cylinder head 12 through an intake manifold 56. The intake manifold 56 consists of a main tube portion 58 located below the main barrels 38 and 40 of the carburetor 36 and main and auxiliary runner portions 60 and 62 which are shown cast into an integral structure. The main runner portions 60 are branched from the main tube portion 58 and are respectively in communication with the intake ports 28 in the cylinder head 12 and the auxiliary runner portions 62 are branched from the auxiliary barrel 42 through a lowered well portion 66 which is common to the runner portions 64.

Each of the carburetor barrels 38, 40 and 42 is provided with a full complement of fuel and air feed circuits including choke, float bowl, idle, off-idle, high-speed, high-speed full power and acceleration circuits, though not shown. The circuits associated with the main barrels 38 and 40 are arranged to deliver a relatively lean air-fuel mixture while the circuits associated with the auxiliary barrel 42 are arranged to deliver a relatively rich air-fuel mixture. The circuit arrangements for the barrels 38, 40 and 42 are, however, practically independent in effect from each other and, for this reason, it is extremely difficult to have the main and auxiliary combustion chambers 20 and 22 supplied with air-fuel mixtures which are proportioned and regulated properly to meet the requirements of the engine under various operating conditions as previously pointed out. With a view to overcoming such a problem, a mechanical linkage 66 may be provided which operatively interconnects the throttle valve 48 of the primary barrel 38 and the throttle valve 54 of the auxiliary barrel 42 so that the flows of the air-fuel mixtures through the primary and auxiliary barrels 38 and 42 are controlled on substantially similar schedules depending upon the operating conditions of the engine. Because, however, of the fact that the respective air and fuel feed circuits predominant over the proportions of the air-fuel mixture to be supplied to the main and auxiliary combustion chambers 20 and 22 are still left independent in effect from each other, the mixtures delivered from the main and auxiliary barrels of the carburetor cannot be controlled in close relation to each other for air-to-fuel ratios optimum for the various operating conditions of the engine such as the closed-throttle, part-throttle and full-throttle conditions. Such a problem becomes more serious if the mechanical linkage 66 is loosely fitted or chatters on the throttle valves 48 and 54 (or more exactly on the shafts carrying the valves) and thus fails to produce accurately synchronized motions of the valves. As previously mentioned, this makes practically meaningless the added complications of construction and the extra production cost resulting from the provision of the auxiliary barrel.

Figure 2:
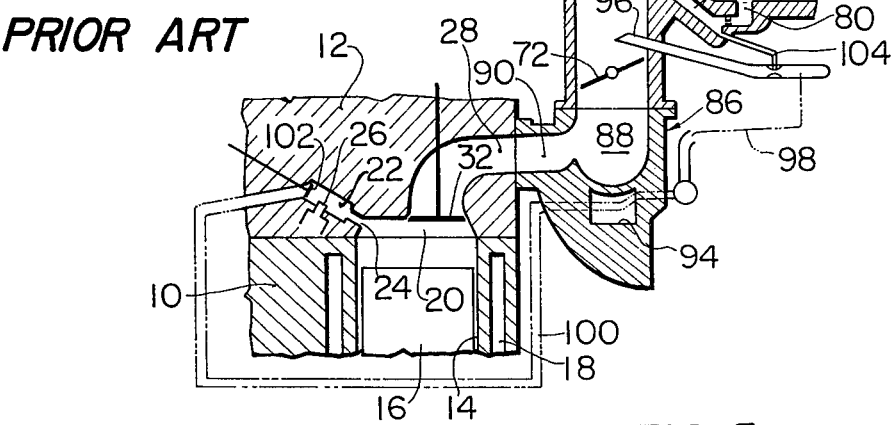
FIG. 2 is a view similar to FIG. 1 but shows another example of the mixture delivery and induction system.
Figure 3A:
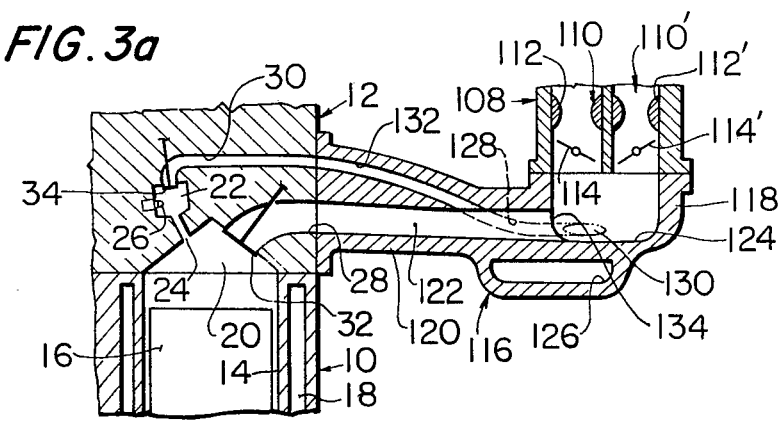
FIG. 3a is a schematic vertical sectional view showing an arrangement including a preferred embodiment of an air-fuel mixture induction system according to the present invention.
Figure 3B:
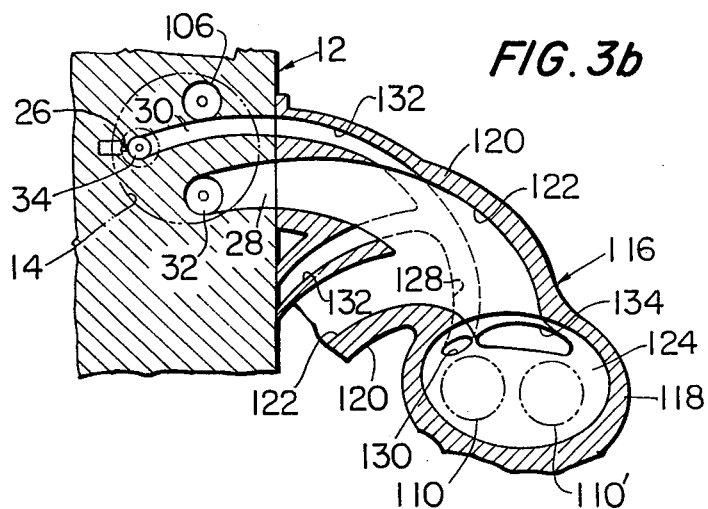

FIG. 2 illustrates an advanced version of carburetor which has been proposed to provide a solution toward this problem. The engine combined with the carburetor herein shown as in itself essentially similar to the engine illustrated in FIG. 1 except in that the cylinder head 12 is formed with only the intake ports 28 leading to the main combustion chambers 20, respectively, of the individual cylinders 14 only one of which is shown. The carburetor, now designated in its entirety by reference numeral 68 although only part thereof is shown, is of the single-barrel design having a venturi 70, a throttle valve 72 located downstream of the venturi 70, and a main fuel feed circuit which includes a float bowl or fuel reservoir 74 with a float 76 floating in the liquid fuel stored in the bowl 74. A main fuel feed passageway 78 leads from a main jet 80 at the bottom of the float bowl 74 and communicates by way of a main well 82 with a main fuel discharge nozzle 84 which projects into the venturi 70, completing the main fuel feed circuit. The carburetor is connected to the cylinder head 13 of the engine through an intake manifold 86 which consists of a main tube portion 88 located below the carburetor barrel and a plurality of runner portions 90 branched from the main tube portion 88 and respectively in communication with the interest ports 28 leading to the main combustion chambers 20 of the engine cylinders 14 across the intake valves 32. The main tube portion 88 has a bottom wall 92 below which is formed a heat transfer chamber 94 communicating with the exhaust manifold (not shown) of the engine so that the hot exhaust gases discharged from the engine cylinders 14 are circulated through the chamber 94 and heats the air-fuel mixture being passed over the bottom wall 92. A mixture inlet pipe 96 projects into the carburetor barrel downstream of the venturi 70 and upstream of the throttle valve 72 and has an open end directed upstream. The mixture inlet pipe 96 is connected at the other end to a main suction conduit 98 which communicates with a plurality of branch suction conduits 100 each passed through the heat transfer chamber 94 and leading to the auxiliary combustion chamber 22 of each engine cylinder 14 across a control valve 102. An additional fuel feed conduit 104 provides direct communication between the mixture inlet pipe 96 and the fuel feed passageway 78 of the main fuel feed circuit. The liquid fuel directed into the pipe 96 from the fuel feed passageway 78 is admixed to the air-fuel mixture drawn into the pipe 96 from the carburetor barrel and forms an air-fuel mixture richer than the mixture to be fed to the main combustion chambers 20 through the intake manifold 86. The relatively rich mixture is passed through the main suction conduit 98 and thereafter through the branch suction conduits 100 into the respective auxiliary combustion chambers 22 for the individual engine cylinders 14. The air-to-fuel ratio of the mixture supplied to each main combustion chamber 20 is, thus, not strictly related to that of the mixture supplied to each main combustion chamber 20 although the flow of the mixture through the main suction conduit 98 and each of the branch suction conduits 100 and the rate of passage of the liquid fuel from the main fuel feed passageway 78 to the pipe 96 through the additional fuel feed conduit 102 may vary with the differential pressure between the carburetor barrel upstream of the throttle valve and each of the auxiliary combustion chambers 22. Because, however, the mixture supplied to each auxiliary combustion chamber 22 is richer than the mixture supplied to each main combustion chamber 22, the engine per se is capable of operating in substantially similar conditions to the engine equipped with the mixture delivery system illustrated in FIG. 1 even though the carburetor 68 for the former is void of a mixture delivery unit proper to the auxiliary combustion chamber 22 and is thus far simpler in construction than the carburetor for the latter. As previously pointed out, however, the mixture delivery system shown in FIG. 2 is still unsatisfactory because of the additional space and cost required for the installation of the mixture inlet pipe 96, conduits 98, 100 and 104 and other parts and element associated with the pipe and conduits and because of the extra design considerations required to achieve smooth flow through the conduit 98 and each of the conduits 100. The presence of the mixture inlet pipe 96 projecting into the venturi 70 forms a resistance to the flow of air-fuel mixture through the carburetor barrel as has also noted FIGS. 3a and 3b illustrate a preferred embodiment of the mixture induction system according to the present invention adapted to eliminate the drawbacks inherent in both of the mixture delivery systems thus far described with reference to FIGS. 1 and 2. The internal combustion engine shown in FIGS. 3a and 3b is in itself similar in construction and arrangement to its counterpart shown in FIG. 1, having main intake ports 28 leading to main combustion chambers 22 of engine cylinders 14 across main intake valves 32 and auxiliary intake ports 30 leading to auxiliary combustion chambers 22 for the cylinders 14 across auxiliary intake valves 34, respectively. Designated by reference numeral 106 in FIG. 3b is an exhaust valve across which the main combustion chamber 20 is in communication with the exhaust manifold (not shown) of the engine. The internal combustion engine is combined with an air-fuel mixture delivery system which is shown constituted by a carburetor of, by way of example, a dual or two-barrel type having a parallel combination of primary and secondary barrels 110 and 110'. Similarly to the main barrels 38 and 40 of the carburetor 36 shown in FIG. 1, the primary and secondary barrels 110 and 110' of the carburetor 108 comprise venturi 112 and 112' and throttle valves 114 and 114' which are located downstream of the venturis 112 and 112', respectively. Though not shown, each of the barrels 110 and 110' has a full complement of air and fuel circuits which include, as is customary, choke, float bowl, idle, off-idle, high-speed, high-speed full power and acceleration circuits. The carburetor 108 thus arranged is connected to the cylinder head 12 by means of an intake manifold 116.

The intake manifold 116 constitutes, in combination with the intake ports 30 formed in the cylinder head 12, a mixture induction system embodying the present invention and comprises a main tube portion 118 communicating with the primary and secondary carburetor barrels 110 and 110' downstream of the throttle valves 114 and 114', respectively, and a plurality of runner portions 120 which are branched from the main tube portion 118. Each of the runner portions 120 is internally formed with a passageway 122 leading from the plenum area in the main tube portion 118 to each of the intake ports 30 in the cylinder head 12. The carburetor 108 is assumed to be of the down-draft type having the throttle valves 114 and 114' located in the bottom portions of the barrels 110 and 110', respectively, so that the plenum area in the main tube portion 118 is located below the barrels 110 and 110' and the runner portions 120 extend substantially horizontally between the main tube portion 118 and the main intake ports 30, as shown. The main tube portion 118 has a bottom wall 124 having an inner or upper surface substantially flush with the bottom surface of each of the passageways 122 in the runner portions 120. The bottom wall 124 forms part of the manifold floor which is substantially flat in the embodiment illustrated in FIGS. 3a and 3b. A heat transfer chamber 126 is positioned directly under the manifold floor and has a portion located below the bottom wall 124 of the main tube portion 118. The heat transfer chamber 126 is in communication with a source of fluid heated by the heat developed as a result of the operation of the engine so that the hot fluid circulated through the heat transfer chamber 126 preheats the mixture being passed through the plenum area in the main tube portion 118 and the passageways 122 in the runner portions 120. The heat transfer chamber 126 may be arranged similarly to the usual manifold crossover chamber communicating with the exhaust manifold (not shown) of the engine or, as an alternative, may be in communication with the water jackets 18 formed in the cylinder block 10. The plenum area in the main tube portion 118, the passageways 120 in the runner portions 120 and the intake ports 28 in the cylinder head 12 constitute as a whole main mixture delivery means in the mixture induction system.

The intake manifold 116 is further formed with an auxiliary passageway 128 which is open into the plenum area in the main tube portion 118 through an opening 130 formed in an internal wall of the main tube portion 118. The passageway 128 merges into a plurality of branch passageways 132 which are respectively in communication with the intake ports 30 leading to the auxiliary combustion chambers 22 in the cylinder head 12. Constant communication is this provided between each of the auxiliary intake ports 30 and the plenum area in the main tube portion 118 of the intake manifold 116 through the opening 130 in a side wall near the bottom 124 of the main tube portion 118 the passageway 128 and each of the branch passageways 132. The communication is extended to each of the auxiliary combustion chambers 22 when the intake valve 34 associated with the combustion chamber 22 is open during intake stroke of the engine cylinder 14.

The primary and secondary barrels 110 and 110' of the carburetor 118 are arranged in such a manner as to deliver a relatively lean air-fuel mixture having an air-to-fuel ratio within the range of, for example, from about 15:1 to about 30:1. The mixture is distributed through the plenum area in the main tube portion 118 of the intake manifold 116 partly into the passageways 122 in the runner portions 120 and partly into the passageway 128 through the opening 130. The mixture in each runner portion 120 is drawn through each of the main intake port 28 into the associated main combustion chamber 20 during intake stroke of the engine cylinder 14 when the intake valve 32 is open. While the air-fuel mixture is flowing through the plenum area in the main tube portion 18 of the intake manifold 116, liquid fuel drops out of the mixture and spreads in a thin layer over the surface of the manifold floor. The film of the liquid fuel is in part evaporated by the heat transferred to the mainfold floor from the heat transfer chamber 126 in contact with the underside of the manifold floor and in part sucked into the passageway 128 through the opening 130 in the side wall of the main tube portion 118. The liquid fuel thus admitted to the passageway 128 is evaporated by the heat transferred thereto from the heat transfer chamber 126 through the bottom wall 124 and is admixed to the relatively lean air-fuel mixture which has been admitted into the passageway 128 from the plenum area in the main tube portion 118. The enriched air-fuel mixture is passed through each of the branch passageways 132 and each of the auxiliary intake ports 30 into each of the auxiliary combustion chambers 22 in the cylinder head 12 during intake stroke of the associated engine cylinder 14 when the intake valve 34 is open.

The opening 130 at the inlet of the passageway 128 may be located anywhere in the bottom wall 124 of the main tube portion 118 of the intake manifold 116. Where the intake mainfold 116 is provided in combination with the two-barrel carburetor as in the arrangement herein shown, however, it is preferable that the opening 130 be located below the primary barrel 110 of the carburetor 108 as shown so that the mixture supplied to the auxiliary combustion chambers 22 can be enriched not only when both of the primary and secondary barrels 110 and 110' are in operation but during low-load or idling operation of the engine when only the primary barrel 110 is in play.

Figure 4:
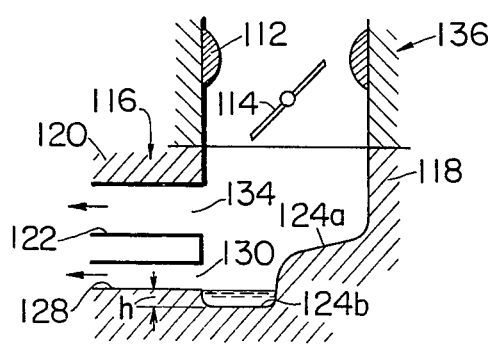
FIGS. 4 and 5 are schematic vertical sectional views each showing part of an arrangement including another preferred embodiment of the mixture induction system according to the present invention.
Figure 5:
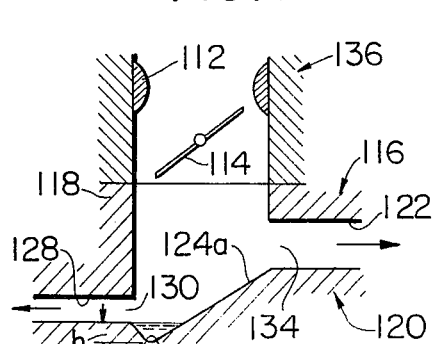

In the intake manifold 116 shown in FIGS. 3a and 3b, the passageways 122 in the individual runner portions 120 are shown to lead from the plenum area in the main tube portion 118 jointly through an opening 134 which is formed in a side wall of the main tube portion 118 and which is located substantially on the same level as the inlet opening 130 of the passageway 128 leading to the auxiliary intake ports 30 with the inner or upper surface of the bottom wall 124 of the main tube portion 118 merging substantially horizontally into the upper surface of the bottom wall of each of the runner portions 120. If desired, however, the inlet opening 130 of the passageway 128 may be located on a level lower than the level of the inlet opening 134 of the passageways 122 in the runner portions 120 so that a well is formed at the bottom of the plenum area adjacent the inlet opening 130 of the passageway 128. FIGS. 4 and 5 illustrate examples of such an arrangement. In each of FIGS. 4 and 5, the carburetor generally designated by reference numeral 136 is assumed to be one of the single barrel type having a venturi 112 and a throttle valve 114. This is, however, merely for the sake of simplicity of illustration and, thus, it is apparent that the mixture induction system partly shown in each of FIGS. 4 and 5 may be combined with a carburetor of any of the other known types.

In the arrangement shown in FIG. 4, the main tube portion 118 of the intake manifold 116 has a bottom wall consisting of a ramp portion 124a and an unvaporized fuel trap, or as it will be referred to hereinafter a well-forming portion, 124b merging out of the ramp portion 124a. The inlet opening 130 of the passageway 128 leading to the auxiliary intake ports is located adjacent the well-forming portion 124b and the ramp portion 124a slants downwardly toward that side of the well-forming portion 124b which is opposite to or otherwise remote from the opening 130. The inlet opening 130 has a lower end located on a level slightly above the level of the lower end of the well-forming portion 124b. The height, denoted by h in FIG. 4, of the lower end of the opening 130 over the level of the lower end of the well-forming portion 124b is selected depending upon the specific performance characteristics of the engine. The ramp portion 124a is shown to have an inner or upper surface which is downwardly curved but, if desired, ramp portion may have a downwardly inclined flat surface. The inlet opening 134 of the passageways 122 in the runner portions 120 is located above the inlet opening 130 of the passageway 128 and the passageways 122 thus leading from the inlet opening 134 extend substantially horizontally above the passageway 128 leading from the inlet opening 130. With the intake manifold 116 thus arranged, the droplets and thin film of liquid fuel deposited on the inner or upper surface of the ramp portion 124a are forced to flow over the surface under the influence of the draft of the mixture through the main tube portion 118 and are collected in the concavity formed by the well-forming portion 124b. The liquid fuel accumulated in the concavity overflows into the passageway 128 or is drawn into the passageway 128 by the suction developed therein and is thus admixed to the air-fuel mixture drawn into the passageway 128 from the carburetor 136 through the plenum area in the main tube portion 118. The resultant mixture richer than the mixture delivered from the carburetor 136 is supplied to each of the auxiliary combustion chambers as in the embodiment illustrated in FIGS. 3a and 3b. While the passageways 122 and 128 leading to the main and auxiliary combustion chambers are arranged to extend in the same directions from the plenum area in the main tube portion 118 of the intake manifold 116 shown in FIG. 4, the passageways 122 and 128 may extend in opposite directions as in the arrangement shown in FIG. 5. In this instance, the inlet opening 134 of the passageways 122 leading to the main combustion chambers is located at the upper end of the ramp portion 124a of the bottom wall of the main tube portion 118 while the inlet opening 130 of the passageway 128 leading to the auxiliary combustion chambers is located opposite to the opening 134 and adjacent to the well-forming portion 124b of the bottom wall. In the arrangement of FIG. 5, the ramp portion 124a of the bottom wall of the main tube portion 118 is shown to have a flat inner or upper surface downwardly inclined from the lower end of the inlet opening 134 of the passageways 122 toward the lower end of the well-forming portion 124b. As in the arrangement shown in FIG. 4, the lower end of the inlet opening 128 leading to the auxiliary combustion chambers is shown to have a height h over the level of the lower end of the well-forming portion 124b. If desired, the height h in each of the arrangement shown in FIGS. 4 and 5 may be made substantially zero so that the lower end of the well-forming portion 124b is located at the same level as the level of the lower end of the opening 130 and accordingly the passageway 128 leading to the auxiliary combustion chambers extends substantially horizontally from the lower end of the well-forming portion 124b, though not shown in the drawings.

Figure 6A:
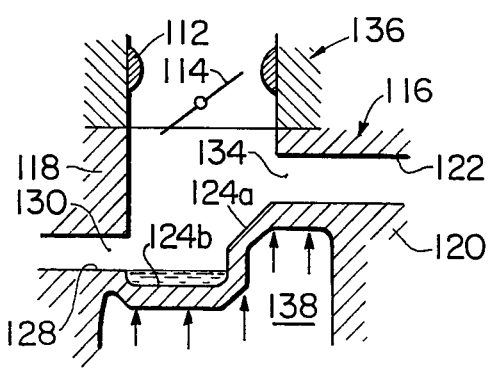
Figure 6B:
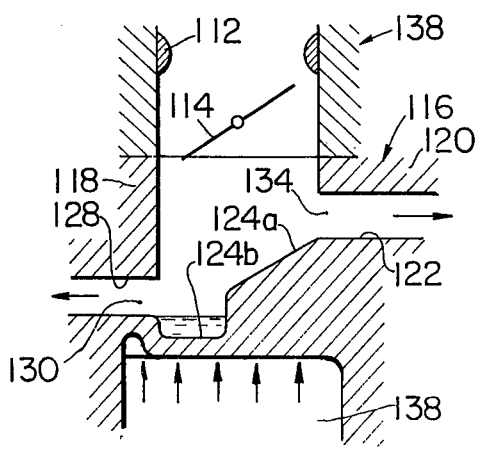

FIGS. 6a, 6b and 6c show embodiment wherein the intake manifold 116 arranged essentially similarly to the intake manifold of the arrangement illustrated in FIG. 5 is provided with heat transfer means effective to heat the floor wall of the intake manifold by the heat which is developed as a result of the operation of the engine. In the arrangement illustrated in FIG. 6a, the bottom wall of the main tube portion 118 of the intake manifold 116 has a thickness which is substantially uniform throughout its ramp and well-forming portions 124a and 124b. Underneath the bottom wall thus formed is disposed a heat transfer chamber 138 which has an upper end defined by the underside of the bottom wall of the main tube portion 118. Similarly to the heat transfer chamber 126 provided in the intake manifold 116 of the embodiment illustrated in FIGS. 3a and 3b, the heat transfer chamber 138 is in communication with either the exhaust manifold (not shown) of the engine or the cooling water jacket 18 (FIG. 3a) in the cylinder block so that the heat in the hot exhaust gases discharged from the engine cylinders or the heat in the hot water flowing out of the water jackets is circulated through the heat transfer chamber 36 and heat the bottom wall of the main tube portion 118 of the intake manifold 116. The heat is then transferred from the ramp portion 124a of the bottom wall to the liquid fuel on the inner surface of the ramp portion and from the well-forming portion 124b of the bottom wall to the liquid fuel in the concavity formed by the well-forming portion and promotes the liquid fuel to evaporate. While the bottom wall of the main tube portion 118 has a thickness which is substantially uniform throughout the ramp and well-forming portions 124a and 124b thereof in the arrangement shown in FIG. 6a, the thickness of the bottom wall may be varied so that the ramp portion 124a has a wall thickness greater than that of the well-forming portion 124b as in the embodiment illustrated in FIG. 6b. In this instance, the inner surface of the ramp portion 124a is spaced a greater distance from the upper end of the heat transfer chamber 138 than the inner surface of the well-forming portion 124b so that the liquid fuel to enter the passageway 128 leading to the auxiliary combustion chambers is heated more positively that the liquid fuel in contact with the ramp portion 124a. As an alternative to the heat transfer chamber 138 thus arranged, first and second heat transfer chambers 138a and 138b may be formed below the ramp and well-forming portions 124a and 124b, respectively, of the bottom wall of the main tube portion 118 of the intake manifold 116 as in the embodiment shown in FIG. 6c. The first and second heat transfer chambers 138a and 138b are separated from each other by a wall portion 140 forming part of the manifold floor and are respectively in communication with different sources (not shown) of heat developed by the operation of the engine. Preferably, the first heat transfer chamber 138a below the ramp portion 124a is in communication with the cooling water jackets 18 in the cylinder block 10 (FIG. 3a) and the second heat transfer chamber 138b below the well-forming portion 124b is in communication with the exhaust manifold (not shown) of the engine so that the well-forming portion 124b is heated to a higher temperature than the ramp portion 124a with the ramp and well-forming portions 124a and 124b arranged to have substantially equal wall thicknesses as illustrated. The arrangement of the heat transfer means in each of the embodiments shown in FIGS. 6b and 6c.

FIGS. 7a and 7b show a modification of the embodiment illustrated in FIGS. 3a and 3b. While the individual passageways 132 leading to the auxiliary combustion chambers 22 through the auxiliary intake ports 30 are in communication with the plenum area in the main tube portion 118 of the intake manifold 116 by way of the passageway 128 which is common to the branch passageways 132 in the embodiment shown in FIGS. 3a and 3b, the passageways 132 in the embodiment illustrated in FIGS. 7a and 7b are respectively open into the individual runner portions 120 of the intake manifold 116. Each of the passageways 132 is thus open to each of the passageways 122 in the runner portions 120 through an opening 142 which is formed in the internal wall defining the passageway 132 in each runner portion 120.

In operation, the air-fuel mixture admitted from the plenum area in the main tube portion 118 of the intake manifold 116 into each of the passageways 122 in the runner portions 120 flows through the passageway 122 while swirling along the surface of the internal wall of the runner portion. As a consequence, droplets of liquid fuel adhere to the inner surface of the runner portion 120 and spreads in a thin layer over the surface. The film of the liquid fuel is in part sucked into the passageway 132 in each runner portion 120 through the opening 142 at the inlet of the passageway along with the air-fuel mixture drawn into the passageway 132 from the passageway 122 in the runner portion 120 through the opening 142. The liquid fuel thus sucked into each of the passageways 132 is admixed to the mixture flowing through the passageway and the resultant mixture which is richer than the mixture delivered into the intake manifold 116 from the carburetor 108 is supplied to each of the auxiliary combustion chambers 22 via the intake port 30 leading from the passageway 132. The passageways 132 thus arranged are useful for simplifying the operation to fabricate the intake manifold 116 because the passageways have reduced lengths and for this reason the core used to form such passageways can be designed, engineered and mounted in a mold with utmost ease. Designated by reference numeral 144 in FIG. 7b is an exhaust port which leads from the main combustion chamber 20 of the engine cylinder 14 across the exhaust valve 106.

FIG. 8 illustrates still another embodiment of the mixture induction system according to the present invention. The mixture induction system herein shown is characterized in that the intake manifold 116 forming part of the system is formed with no auxiliary passageways other than the passageways 122 leading to the main intake ports 30 in the cylinder head 12. The intake manifold 116 in the embodiment shown in FIG. 8 is, thus, constructed entirely similarly to any of the existing intake manifolds which are designed for use with an ordinary multiple-cylinder internal combustion engine having only one combustion chamber for each of the engine cylinders. In the embodiment shown in FIG. 8, each of the intake ports 30 leads to each auxiliary combustion chamber 22 from the main intake port 28 through an opening 144 formed in a wall portion of the cylinder head 12 defining the main intake port 28 as shown. The thin film of liquid fuel spreading over the surface defining each main intake port 28 is partially sucked into the associated auxiliary intake port 30 through the opening 146 at the inlet of the intake port 30 together with the air-fuel mixture admitted into the intake port 30 from the main intake port 28 and produces a richer air-fuel mixture in the auxiliary intake port 30. The embodiment shown in FIG. 8 is, thus, useful for reducing the production cost of the engine of the described character because not only the carburetor but the intake manifold can be of an existing type.

While it has been assumed that the runner portions of the intake manifold are respectively in communication with the main intake ports in each of the embodiment thus far described, it is apparent that the improvement according to the present invention may be incorporated in an arrangement in which each of the runner portions of an intake manifold leads to two or even more main intake ports if suitable modification is made in each of the embodiments described. It is, furthermore, apparent that each of the embodiment shown in FIGS. 7a and 7b and the embodiment shown in FIG. 8 may be put into practice in combination with not only with a carburetor of a down-draft type but with a carburetor of an up-draft or horizontal-draft design.

What is claimed is:

1. An air-fuel mixture induction system for an automotive multiple-cylinder internal combustion engine having main and auxiliary combustion chambers for each of the engine cylinders and combined with a carburetor having a throttle valve, comprising main mixture delivery passageway means having internal wall portions formed with intake ports respectively in communication with the main combustion chambers of the cylinders and an intake manifold consisting of a main tube portion having an internal space communicating with the carburetor downstream of the throttle valve and runner portions branched from said main tube portion and formed with passageways communicating upstream with said internal space in said main tube portion and downstream with said intake ports, and auxiliary passageways each providing communication between each of the auxiliary combustion chambers and said internal space in said main tube portion through an opening in at least one of said internal wall portions.

2. An air-fuel mixture induction system as set forth in claim 1, in which said opening is formed in said main tube portion and which further comprises a passageway leading from said opening and branched into said auxiliary passageways.

3. An air-fuel mixture induction system as set forth in claim 2, in which said carburetor is of a down-draft type having a lower end connected to said main tube portion of said intake manifold and in which said opening is formed in a side wall near the bottom of the main tube portion below said carburetor.

4. An air-fuel mixture induction system as set forth in claim 3, in which said main tube portion of said intake manifold has a bottom wall located below said carburetor and includes a unvaporized fuel trap located adjacent said opening.

5. An air-fuel mixture induction system as set forth in claim 4, in which said opening has a lower end located on a level higher than the lower end of said unvaporized fuel trap.

6. An air-fuel mixture induction system as set forth in claim 4, in which said bottom wall of said main tube portion further includes a ramp portion downwardly merging into said unvaporized fuel trap.

7. An air-fuel mixture induction system as set forth in claim 6, in which said ramp portion has a substantially flat inner surface which slants downwardly toward said unvaporized fuel trap.

8. An air-fuel mixture induction system as set forth in claim 6, in which said ramp portion has an inner surface which is downwardly curved toward said unvaporized fuel trap.

9. An air-fuel mixture induction system as set forth in claim 6, further comprising heat transfer means contacting said bottom wall of said main tube portion and in communication with at least one source of heat developed as a result of the operation of said engine.

10. An air-fuel mixture induction system as set forth in claim 9, in which said heat transfer means comprise a heat transfer chamber formed underneath said bottom wall of said main tube portion and in communication with said source of heat.

11. An air-fuel mixture induction system as set forth in claim 10, in which said bottom wall has a thickness which is substantially uniform throughout said ramp and unvaporized fuel trap thereof.

12. An air-fuel mixture induction system as set forth in claim 10, in which said ramp portion of said bottom wall has a greater wall thickness than the wall thickness of said unvaporized fuel trap of the bottom wall.

13. An air-fuel mixture induction system as set forth in claim 10, in which said source of heat is the exhaust manifold of the engine.

14. An air-fuel mixture induction system as set forth in claim 10, in which said source of heat is the cooling water jacket of the engine.

15. An air-fuel mixture induction system as set forth in claim 9, in which said heat transfer means comprise a first heat transfer chamber formed underneath said ramp portion of said bottom wall and communicating with a first source of heat and a second heat transfer chamber formed underneath said unvaporized fuel trap of said bottom wall and communicating with a second source of heat, the heat from said first source being lower in temperature than the heat from said second source.

16. An air-fuel mixture induction system as set forth in claim 15, in which said first source of heat is constituted by the cooling water jacket of the engine and said second source of heat is constituted by the exhaust manifold of the engine.

17. An air-fuel mixture induction system as set forth in claim 2, in which said carburetor is of a two-barrel type having primary and secondary barrels and in which said opening is located in alignment with said primary barrel.

18. An air-fuel mixture induction system as set forth in claim 1, in which said auxiliary passageways are open respectively into said runner portions each through an opening formed in the internal wall portion defining the passageway in each runner portion.

19. An air-fuel mixture induction system as set forth in claim 1, in which said auxiliary passageway are open respectively into said intake ports each through an opening formed in the internal wall portion defining each intake port.

* * * * *